March 18, 1952 P. L. BETZ Re. 23,470

ELECTRICAL ENERGIZING MEANS FOR LIMIT CONTROL DEVICES AND THE LIKE

Original Filed May 24, 1949

INVENTOR.
Paul L. Betz.
BY
Cameron, Kerkam & Sutton
ATTORNEYS

Reissued Mar. 18, 1952

Re. 23,470

UNITED STATES PATENT OFFICE 23,470

ELECTRICAL ENERGIZING MEANS FOR LIMIT CONTROL DEVICES AND THE LIKE

Paul L. Betz, Baltimore, Md., assignor to Consolidated Gas Electric Light and Power Company of Baltimore, Baltimore, Md., a corporation of Maryland Original No. 2,569,397, dated September 25, 1951, Serial No. 95,130, May 24, 1949. Application for reissue October 26, 1951, Serial No. 253,323

8 Claims. (Cl. 175—335)

Matter enclosed in heavy brackets [ ] appears in the original patent but forms no part of this reissue specification; matter printed in italics indicates the additions made by reissue.

This invention in its broader aspects relates to an electrical device which, upon opening of a circuit therein, causes an impulse to be generated which may be used to actuate an electrically or electromagnetically controlled mechanism. In a narrower sense, and as a specific application of such a device, the present invention relates to an electrical device which, upon opening of a circuit therein, will cause a thermoelectrically controlled mechanism to be operated, notwithstanding the continued generation of thermoelectric current, as if the thermoelectric current had passed below a predetermined value. By way of illustration, the invention will be particularly explained with respect to its latter use, but it is to be understood that the electrical device for generating an impulse on opening of a circuit is of wider utility as will be apparent to those skilled in the art.

In many electrical circuits energization of limit control means is effected by closing a switch in a control circuit. For example, in my pending application Serial No. 653,494, filed March 11, 1946, now Patent No. 2,505,730, dated April 25, 1950, I have disclosed a thermoelectrically actuated shut-off valve used to control the flow of fuel to a main burner. A pilot burner associated with the main burner serves the double purpose of igniting the fuel at the main burner and of heating the hot junction of the thermocouple of the shut-off valve. The main burner in this example supplies heat to a water heater, the tank of which is provided with a switch responsive to the temperature or pressure of the water within the tank. This switch is so arranged that as long as the water temperature or pressure is below a predetermined value, the switch contacts remain open, and, upon attainment of the predetermined temperature or pressure, the contacts close. Closure of the switch contacts causes alternating current to be supplied to the thermoelectric circuit of the shut-off valve to cause the valve to close. The switch is required to close only when an abnormal temperature or pressure occurs. In said application this limit control operation is accomplished by the superposition of alternating current on the direct current of the thermocouple, and this causes the shut-off to close even though normal thermoelectric current is flowing.

In certain cases it is desirable that the superposition of alternating current on the thermoelectric current be occasioned by the opening of a circuit, as by a switch, when an excessive temperature or pressure occurs, rather than a closing thereof. This introduces a [“full-safe”] *fail-safe* characteristic, which may also be effective upon the occurrence of a broken wire, failure to make electrical contact, etc., to cause the shut-off valve to move to its inoperative position.

It is an object of this invention to provide an improved system to effect actuation of a safety device upon opening of a control circuit.

Another object of this invention is to provide an improved electrical actuating device which, upon opening of a circuit therein, will generate an impulse that can be used to actuate an electrically or electromagentically controlled mechanism.

Another object of this invention is to provide a thermoelectrically controlled mechanism with improved electrical means which, upon the opening of a control circuit, will cause the thermoelectrically controlled mechanism to be actuated as if the thermoelectrical current had passed below a predetermined value.

Another object of this invention is to provide a device of the type characterized which is simple in construction and one which may be readily incorporated in existing systems as well as embodied in new systems for the purposes of effecting actuation of an electrically or electromagnetically controlled mechanism upon an opening of a control circuit.

In brief, the control device of the present invention comprises a pair of transformers having their secondary windings connected in series and their primary windings connected in parallel, the secondary windings being so constructed that when energized the resulting voltage is zero or substantially zero, but when the circuit of one of said primary windings is opened, the voltage generated in the secondary winding associated with the other primary winding is no longer balanced out, but is available for use in actuating an electrically or electromagnetically controlled [mechanim] *mechanism.* As applied to the actuation of a thermoelectrically controlled mechanism, said unbalanced voltage in the active secondary winding is utilized at the thermoelectrically controlled mechanism to produce an actuation thereof such as would arise if the thermoelectric current passed below a predetermined value.

The invention is capable of being embodied in a variety of ways as will appear from the ensuing description, and it is therefore to be expressly understood that the embodiments selected for illustrating the application of the invention are not to be construed as defining the limits of the invention, reference being had to the appended claims for that purpose.

Referring in detail to the accompanying drawings, wherein the same reference characters are used to designate corresponding parts in the several figures, Fig. 1 is an electrical diagram showing an embodiment of the electrical device for generating an impulse upon opening of a control circuit;

Figure 1:
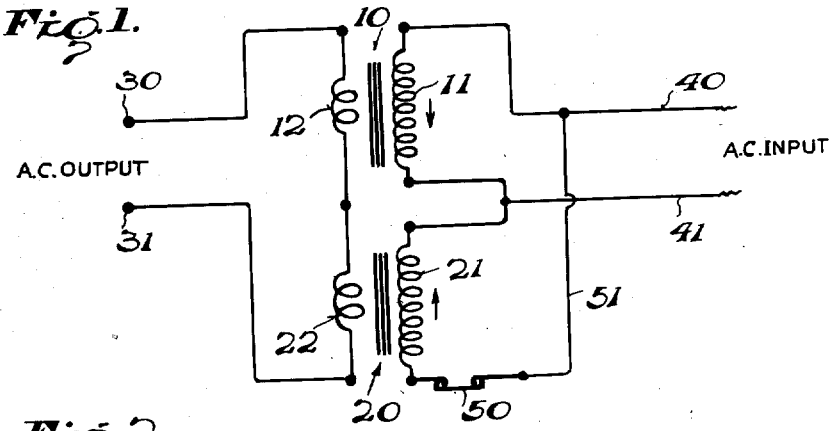

Referring first to Fig. 1, two transformers 10 and 20 are indicated as having primary windings 11 and 21, respectively, and secondary windings 12 and 22, respectively. The secondary windings 12 and 22 are connected in series to output leads including alternating current output terminals 30 and 31. The primary windings 11 and 21 are connected in parallel to alternating current input leads 40 and 41 in circuit with any suitable source of alternating current. The secondary windings 12 and 22 of said transformers have such parameters that the voltages induced therein are equal or nearly equal in magnitude, and either the primary windings 11 and 21 or the secondary windings 12 and 22 are so connected that the voltages induced in the secondary windings 12 and 22 oppose each other to the end that the net voltage output at the terminals 30 and 31 is zero or nearly so when both primaries are in circuit and are energized. In the form shown in Fig. 1 the primary windings 11 and 21 have opposite polarities as indicated by the arrows.

One of the parallel connections to the primaries 11 and 21 is provided with a normally closed switch 50, here shown as disposed in the lead 51 which connects one end of the primary 21 to one side 40 of the alternating current input circuit.

When alternating current is supplied to the leads 40 and 41 with switch 50 closed, the output voltage at the terminals 30 and 31 is zero or nearly so since the voltages in the secondary windings 12 and 22 are equal and of opposite polarity at every instant. Upon the occurrence of an abnormal condition such that switch 50 is opened, the primary winding 21 of transformer 20 is de-energized. Thereupon the voltage induced in the secondary winding 22 becomes zero, but the voltage available at the terminals 30 and 31 rises from zero to approximately the voltage induced in the secondary winding 12. This alternating current output at the terminals 30 and 31 may be utilized in any desired manner, the energy at these terminals becoming available upon opening the switch and unavailable as long as switch 50 is closed. The same operation as just described would also occur if there were a break in line 51 and therefore the switch 50 is to be taken as typifying any cause of opening the line 51.

In Fig. 1 the connections between the transformers 10 and 20 are such that the secondary windings 12 and 22 are in series with additive polarities and the primary windings 11 and 21 are connected to the alternating current input leads 40 and 41 so as to induce voltages of opposite polarity in the secondary windings 12 and 22. As before indicated, other arrangements of the connections of the transformers 10 and 20 may be employed, the only requirement being that the secondary windings 12 and 22 are connected in series and the primary windings 11 and 21 are connected in parallel under such conditions that when the transformers 10 and 20 are energized the voltage induced at the alternating current output terminals 30 and 31 is zero or approximately zero.

Figure 2:
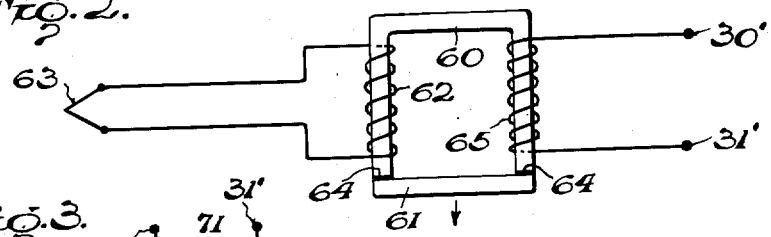
Fig. 2 is a diagram illustrating one way of applying the impulse derived from the device of Fig. 1 for actuation of a thermoelectrically controlled safety device.
Figure 3:
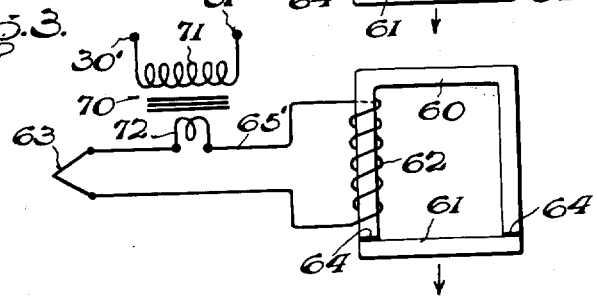
Fig. 3 is a diagram illustrating another way of applying the impulse derived from the device of Fig. 1 for actuating a thermoelectrically controlled safety device.
Figure 4:
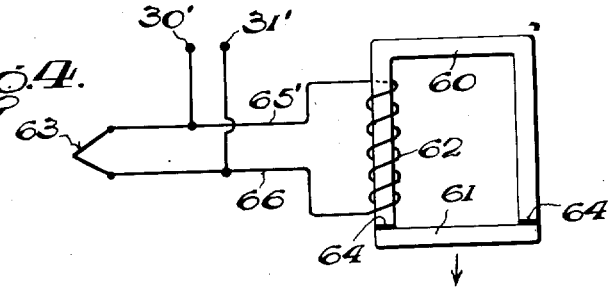
Fig. 4 is a diagram illustrating yet another way of applying the impulse derived from the device of Fig. 1 for actuating a thermoelectrically controlled safety device.

Figs. 2, 3 and 4 illustrate three different ways in which the voltage at output terminals 30 and 31 existing when the line 51 is opened, as by the switch 50, can be applied to a thermoelectrically controlled safety device to effect actuation thereof notwithstanding the continued generation of thermoelectric current.

Safety devices are now well known which include an electromagnet or solenoid for holding a valve in open position, for example, as long as said electromagnet or solenoid is energized by thermoelectric current generated by a thermocouple subjected to the heat of a flame and operating on the principles disclosed in the patent granted to Sebastian Karrer, No. 2,097,838, on November 2, 1937. Upon failure of the source of thermoelectric current, however, the electromagnet or solenoid is de-energized so that the valve, in the illustration assumed, is closed, as by the action of gravity or a spring, if the flame at the thermocouple goes out. Conditions may arise, however, whereby it is desirable that the safety device close even though the flame at the thermocouple continues to generate normal thermoelectric current. Figs. 2, 3 and 4 illustrate how this result may be obtained by use of the voltage (and current) at the output terminals 30 and 31 whenever line 51 is opened.

Referring first to Fig. 2, that portion of a safety device which includes a magnetic core 60 and an armature 61 is shown schematically, said armature 61 being operatively connected in known devices to any suitable valve, switch member, or other member to be controlled (not shown). An electromagnet winding 62 is provided on said magnetic core 60 and is connected to a thermocouple 63. Upon sufficient differential heating between the hot and cold junctions of said thermocouple, the magnetic core 60 is energized to maintain armature 61 against the pole faces 64 thereof, when armature 61 has been moved into engagement with said pole faces, manually or in any other suitable way. As long as electromagnet winding 62 is so energized, armature 61 is therefore maintained in the position illustrated against gravity, or a spring or other force, tending to separate the armature from the pole faces 64.

In conformity with one embodiment of the present invention as shown schematically in Fig. 2, a second electromagnet winding 65 is provided on the core 60 and connected to the terminals 30′ and 31′ which in turn are connected through any suitable lines with the output terminals 30 and 31 of Fig. 1. As long as the switch 50 of Fig. 1 is closed and the alternating current output terminals 30 and 31 supply a zero or a negligible amount of electrical energy to winding 65 through terminals 30′ and 31′, depending on the exactness with which the voltages of the secondary windings 12 and 22 are made to match each other, retention of the armature 61 in its operative position as shown is solely under the control of the thermoelectric circuit 63, 62. Upon occurrence of an abnormal condition which would cause opening of the line 51, as by opening the switch 50, the alternating current now available at the terminals 30 and 31 of Fig. 1 is applied through the terminals 30′ and 31′ to electromagnet winding 65 in Fig. 2. The magnetic field produced by electromagnet winding 65 will, with suitable alternating current flowing therein, cause the net magnetic flux of the electromagnet to fall periodically below that required to maintain armature 61 in the attracted position illustrated, thereby permitting armature 61 to move away from the pole faces 64 to actuate the associated safety device to inoperative position. Thus, opening switch 50 in response to an abnormal condition, or other opening of the line 51, causes the safety device to move to its inoperative position even though normal thermo-electric current continues to flow in electromagnet winding 62.

Fig. 3 indicates schematically another application of the control device of Fig. 1 to a thermoelectrically controlled mechanism, like parts being indicated by like reference numerals. In this figure thermocouple 63 supplies energy to electromagnet winding 62 on core 60, but one lead 65′ between the thermocouple 63 and the winding 62 includes in series the secondary winding 72 of a transformer 70. Primary winding 71 of transformer 70 is connected to terminals 30′ and 31′, which in turn are connected in any suitable way to the output terminals 30 and 31 of Fig. 1. Under normal operating conditions with the line 51 closed at 50, there is zero or negligible energy flow into primary winding 71, and hence zero or a negligible alternating current is induced in the secondary winding 72. Under this condition the direct current generated at the thermocouple 63 energizes the electromagnet winding 62 to maintain armature 61 in contact with the pole faces 64, thereby maintaining the associated safety device in its operative position. Upon occurrence of an abnormal condition which opens the line 51, as at 50, energy is supplied to the output terminals 30 and 31 of Fig. 1, and flows through any suitable connections to the terminals 30′ and 31′ and through the primary winding 71 of transformer 70. This induces voltage in the secondary winding 72, causing an alternating current to be superimposed on the direct current generated by the thermocouple 63, and the resultant current now flows through electromagnet winding 62. With an alternating current component of suitable magnitude the magnetic flux produced by winding 62 will periodically fall below the minimum value necessary to maintain armature 61 in its attracted position, and armature 61 will therefore move to its inoperative position.

In the embodiment shown schematically in Fig. 4, the alternating current output from the terminals 30 and 31 of Fig. 1 is applied through the terminals 30′ and 31′, respectively, to the thermocouple leads 65′ and 66. As viewed from the terminals 30′ and 31′ thermocouple 63 and electromagnet winding 62 are connected in parallel. When line 51 is closed at 50 no alternating current or negligible alternating current is supplied to the terminals 30′, 31′. Upon opening of the line 51, as at 50, however, alternating current from the terminals 30 and 31 is applied to the terminals 30′ and 31′ and thence to the thermocouple leads 65′ and 66. Part of this current flows through the thermocouple 63 and the remainder flows through the electromagnet winding 62, the net current flowing through the latter winding being the result of the superposition of the direct current produced by thermocouple 63 and the said remainder portion of the alternating current. With a suitable alternating current component flowing in the electromagnet winding 62, the magnetic flux will periodically pass through the minimum value required to maintain armature 61 in its attracted position, and armature 61 will thereupon move to its inoperative position.

To illustrate the actual operating characteristics of the device of Fig. 1 when used in the manner indicated schematically in Fig. 4 in controlling a commercial thermo-electric shutoff valve, similar transformers 10 and 20 were used, their secondary windings having a 60 cycle impedance of approximately 0.26 ohm. each. An input voltage of approximately 105 volts, 60 cycles, was applied to the leads 40 and 41, the voltage at each of the secondary windings 12 and 22, with switch 50 closed, being approximately 1.2 volts. With the output terminals 30 and 31 of Fig. 1 connected to the terminals 30′ and 31′ of Fig. 4, opening of the switch 50 increased the current through the terminals 30′ and 31′ from zero to approximately 3.25 amperes. This alternating current superimposed on the direct current generated by the thermocouple 63, and which normally held the valve of the safety device in open position, was sufficient to cause the valve to close.

It will therefore be perceived that the present invention provides an electric device of simple construction which may be readily connected into existing as well as applied to new circuits and which as long as the control circuit is closed, generates substantially no voltage at the output terminals thereof, but upon a break in or other opening of the line including one of the primary windings, an impulse is generated at the output terminals which can be used to actuate electrical or electromagnetically controlled devices. As applied to the actuation of thermoelectrically controlled devices, the alternating current at the output terminals 30 and 31 may be superimposed on the direct current generated by a heated thermocouple, or it may be applied to an electromagnet in circuit with the thermocouple, so that the net current value or the net magnetic flux will periodically pass through a predetermined minimum value and thereby cause the thermoelectrically controlled device to act as if the thermoelectric current had failed or decreased below a predetermined value even though thermoelectric current is still being generated normally.

While the embodiments of the invention illustrated on the drawings have been described with considerable particularity, it is to be expressly understood that such embodiments are for purposes of illustration only, and are not to be construed as definitions of the limits of the invention, as the invention may receive a variety of expressions, as will now be apparent to those skilled in the art, while changes may be made in the details of construction, arrangement, electrical parameters, etc., and parts may be replaced by equivalent parts, without departing from the spirit of this invention. Reference is therefore to be had to the appended claims for a definition of said invention.

What is claimed is:

1. In an electrical energizing means for a control device of the character including a thermoelectric circuit having therein a thermocouple and an electromagnetic means provided with an armature operatively connected to a means to be controlled and retained in operative position by said electromagnetic means while normal thermoelectric current is being generated by said thermocouple, the combination of means for actuating said electromagnetic means to effect release of said armature notwithstanding continued generation of thermoelectric current comprising a control circuit including output leads, input leads operatively connected to a source of alternating current and means in said control circuit having circuit connections to said input leads for imposing substantially zero voltage across said output leads when the circuit connections from said means to said input leads are complete and operable to impose a substantial voltage across said output leads upon interruption of a line in said connections, and means electrically connected to said output leads and associated with said electromagnetic means for applying alternating current in said output leads to said electromagnetic means to reduce the net effect of said thermoelectric current on said electromagnetic means sufficiently to effect release of said armature.

2. In an electrical energizing means for a control device of the character including a thermoelectric circuit having therein a thermocouple and an electromagnetic means provided with a coil and an armature operatively connected to a means to be controlled and retained in operative position by said electromagnetic means while normal thermoelectric current is being generated by said thermocouple, the combination of means for actuating said electromagnetic means to effect release of said armature notwithstanding continued generation of thermoelectric current comprising a control circuit including output leads, input leads operatively connected to a source of alternating current and means in said control circuit having circuit connections to said input leads for imposing substantially zero voltage across said output leads when the circuit connections from said means to said input leads are complete and operable to impose a substantial voltage across said output leads upon interruption of a line in said connections, and means electrically connected to said output leads and associated with said electromagnetic means for applying alternating current in said output leads to said electromagnetic means to reduce the net effect of said thermoelectric current on said electromagnetic means sufficiently to effect release of said armature, said last named means including a second coil associated with said electromagnetic means and electrically connected to said output leads and operable to decrease the net magnetic flux acting on said armature when substantial voltage exists across said output leads.

3. In an electrical energizing means for a control device of the character including a thermoelectric circuit having therein a thermocouple and an electromagnetic means provided with an armature operatively connected to a means to be controlled and retained in operative position by said electromagnetic means while normal thermoelectric current is being generated by said thermocouple, the combination of means for actuating said electromagnetic means to effect release of said armature notwithstanding continued generation of the thermoelectric current comprising a control circuit including output leads, input leads operatively connected to a source of alternating current and means in said control circuit having circuit connections to said input leads for imposing substantially zero voltage across said output leads when the circuit connections from said means to said input leads are complete and operable to impose a substantial voltage across said output leads upon interruption of a line in said connections, and means electrically connected to said output leads and associated with said electromagnetic means for applying alternating current in said output leads to said electromagnetic means to reduce the net effect of said thermoelectric current on said electromagnetic means sufficiently to effect release of said armature, said last named means including a transformer having a secondary in said thermoelectric circuit and a primary electrically connected to said output leads.

4. In an electrical energizing means for a control device of the character including a thermoelectric circuit having therein a thermocouple and an electromagnetic means provided with an armature operatively connected to a means to be controlled and retained in operative position by said electromagnetic means while normal thermoelectric current is being generated by said thermocouple, the combination of means for actuating said electromagnetic means to effect release of said armature notwithstanding continued generation of thermoelectric current comprising a control circuit including output leads, input leads operatively connected to a source of alternating current and means in said control circuit having circuit connections to said input leads for imposing substantially zero voltage across said output leads when the circuit connections from said means to said input leads are complete and operable to impose a substantial voltage across said output leads upon interruption of a line in said connections, and means electrically connected to said output leads and associated with said electromagnetic means for applying alternating current in said output leads to said electromagnetic means to reduce the net effect of said thermoelectric current on said electromagnetic means sufficiently to effect release of said armature, said last named means including leads electrically connecting said output leads in parallel with said thermocouple and electromagnetic means.

5. In an electrical energizing means for a control device of the character including a thermoelectric circuit having therein a thermocouple and an electromagnetic means provided with an armature operatively connected to a means to be controlled and retained in operative position by said electromagnetic means while normal thermoelectric current is being generated by said thermocouple, the combination of means for actuating said electromagnetic means to effect release of said armature notwithstanding continued generation of thermoelectric current comprising a control circuit including output leads, input leads operatively connected to a source of alternating current and a pair of transformers having secondaries in series with said output leads and primaries having parallel connections with said input leads, said transformers being so constructed and connected to said leads that the additive effect of the [current] *voltage* in said secondaries produces substantially zero voltage across said output leads when the circuits through both primaries are closed but operable to impose a substantial voltage across said output leads upon opening of the circuit through one of said primaries while the circuit through the other primary remains closed, and means electrically connected to said output leads and associated with said electromagnetic means for applying alternating current in said output leads to said electromagnetic means to reduce the net effect of said thermoelectric current on said electromagnetic means sufficiently to effect release of said armature.

6. In an electrical energizing means for a control device of the character including a thermoelectric circuit having therein a thermocouple and an electromagnetic means provided with a coil and an armature operatively connected to a means to be controlled and retained in operative positions by said electromagnetic means while normal thermoelectric current is being generated by said thermocouple, the combination of means for actuating said electromagnetic means to effect release of said armature notwithstanding continued generation of thermoelectric current comprising a control circuit including output leads, input leads operatively connected to a source of alternating current and a pair of transformers having secondaries in series with said output leads and primaries having parallel connections with said input leads, said transformers being so constructed and connected to said leads that the additive effect of the [current] *voltage* in said secondaries produces substantially zero voltage across said output leads when the circuits through both primaries are closed but operable to impose a substantial voltage across said output leads upon opening of the circuit through one of said primaries while the circuit through the other primary remains closed, and means electrically connected to said output leads and associated with said electromagnetic means for applying the alternating current in said output leads to said electromagnetic means to reduce the net effect of said thermoelectric current on said electromagnetic means sufficiently to effect release of said armature, said last named means including a second coil associated with said electromagnetic means and electrically connected to said output leads and operable to decrease the net magnetic flux acting on said armature when substantial voltage exists across said output leads.

7. In an electrical energizing means for a control device of the character including a thermoelectric circuit having therein a thermocouple and an electromagnetic means provided with an armature operatively connected to a means to be controlled and retained in operative position by said electromagnetic means while normal thermoelectric current is being generated by said thermocouple, the combination of means for actuating said electromagnetic means to effect release of said armature notwithstanding continued generation of thermoelectric current comprising a control circuit including output leads, input leads operatively connected to a source of alternating current and a pair of transformers having secondaries in series with said output leads and primaries having parallel connections with said input leads, said transformers being so constructed and connected to said leads that the additive effect of the [current] *voltage* in said secondaries produces substantially zero voltage across said output leads when the circuits through both primaries are closed but operable to impose a substantial voltage across said output leads upon opening of the circuit through one of said primaries while the circuit through the other primary remains closed, and means electrically connected to said output leads and associated with said electromagnetic means for applying the alternating current in said output leads to said electromagnetic means to reduce the net effect of said thermoelectric current on said electromagnetic means sufficiently to effect release of said armature, said last named means including a transformer having a secondary in said thermoelectric circuit and a primary electrically connected to said output leads.

8. In an electrical energizing means for a control device of the character including a thermoelectric circuit having therein a thermocouple and an electromagnetic means provided with an armature operatively connected to a means to be controlled and retained in operative position by said electromagnetic means while normal thermoelectric current is being generated by said thermocouple, the combination of means for actuating said electromagnetic means to effect release of said armature notwithstanding continued generation of thermoelectric current comprising a control circuit including output leads, input leads operatively connected to a source of alternating current and a pair of transformers having secondaries in series with said output leads and primaries having parallel connections with said input leads, said transformers being so constructed and connected to said leads that the additive effect of the [current] *voltage* in said secondaries produces substantially zero voltage across said output leads when the circuits through both primaries are closed but operable to impose a substantial voltage across said output leads upon opening of the circuit through one of said primaries while the circuit through the other primary remains closed, and means associated with said electromagnetic means for applying the alternating current in said output leads to said electromagnetic means to reduce the net effect of said thermoelectric current on said electromagnetic means sufficiently to effect release of said armature, said last named means including means electrically connecting said output leads in parallel with said thermocouple and electromagnetic means.

PAUL L. BETZ.

REFERENCES CITED

The following references are of record in the file of this patent or the original patent:

UNITED STATES PATENTS

| Number | Name | Date |
|---|---|---|
| 1,539,658 | Fitzgerald | May 26, 1925 |
| 2,241,127 | Harder | May 6, 1941 |
| 2,306,578 | Wetzel | Dec. 29, 1942 |
| 2,351,277 | Mantz | June 13, 1944 |
| 2,428,747 | Ziebolz | Oct. 7, 1947 |